Patented July 29, 1924.

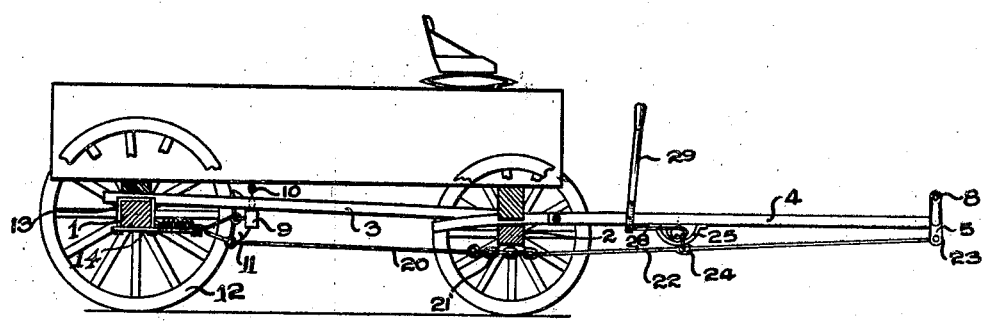
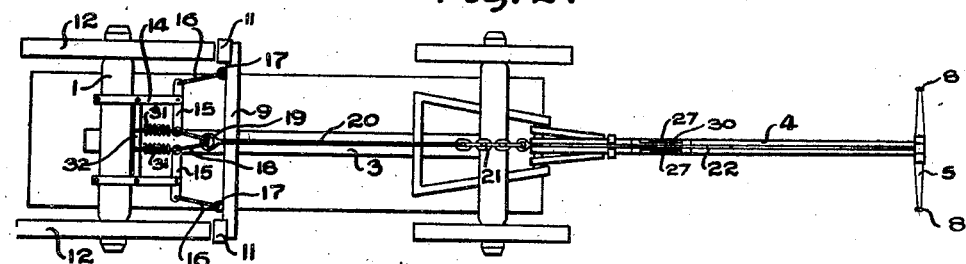
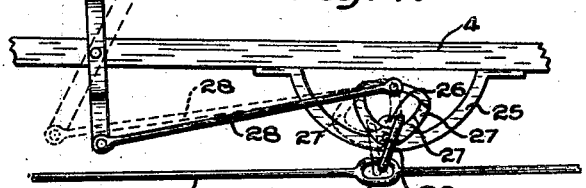

1,502,797

UNITED STATES PATENT OFFICE.

WILLIAM HENRY PERRY, OF BURDETT, ALBERTA, CANADA.

AUTOMATIC WAGON BRAKE.

Application filed February 10, 1923. Serial No. 618,364.

*To all whom it may concern:*

Be it known that I, WILLIAM HENRY PERRY, a subject of the King of Great Britain, and a resident of the village of Burdett, in the Province of Alberta, Canada, have invented certain new and useful Improvements in Automatic Wagon Brakes, of which the following is the specification.

My invention relates to improvements in automatic wagon brakes and the object of the invention is to devise a brake which will automatically function on a down grade, thus taking the load off the team and permitting them to control the wagon at all times.

A further object is to devise manually controlled means which will throw the brake out of action when it is desired to back the vehicle.

My invention consists of an automatic wagon brake constructed and arranged all as hereinafter more particularly described and illustrated in the accompanying drawing in which:

Fig. 1 represents an elevational view of a wagon showing my brake applied thereto, the axles thereof being shown in section.

Fig. 2 is an inverted plan view of a wagon showing my brake applied thereto.

Fig. 3 is an enlarged detail of a portion of the back axle showing the means of mounting my brake actuating means thereon.

Fig. 4 is an enlarged elevational view of a portion of the tongue of the vehicle, showing the manually controlled means for throwing the brake out of action, and Fig. 5 is an elevational detail of a specially constructed form of neck-yoke used in connection with my brake.

Like characters of reference indicate corresponding parts in the different views.

1 is the back axle. 2 is the front axle. 3 is the reach. 4 is the wagon tongue, all of which are of the usual construction. 5 is the neck-yoke constructed according to my invention, which consists of a bifurcated central portion 6 adapted to straddle the forward end of the tongue and to be pivotally connected thereto by means of the trunnion pins 7. The ends of the neck-yoke 5 are provided with the usual rings 8.

9 is the brake beam extending transversely below the wagon box and suitably supported by means of the chains 10, said brake beam carrying the brake shoes 11 which are adapted to engage the rear wheels 12.

13 are inverted spaced apart U-shaped shackles straddling the back axle 1 and having connected thereto the forwardly directed arms 14, each provided at its forward end with the suitably fulcrumed levers 15, the shorter ends of the levers preferably extending outwardly and the longer ends inwardly. 16 are links pivotally connected at their rear ends to the outer ends of the levers 15 and at their forward ends to the eyes 17 on the rear face of the brake beam. 18 are links pivotally connected at their inner ends to the inner ends of the levers 15 and at their forward ends to the eye 19 on the forwardly extending control rod 20, which is provided at its forward end with a chain 21 extending under the front axle 2 of the vehicle.

22 is a rod having its rear end connected to the forward end of the chain 21 and its forward end pivotally connected to a depending lug 23 formed on the bifurcated portion 6 of the neck-yoke. Intermediately of the length of the rod 22 is a ring 24 formed therein. 25 is a depending bracket secured to the tongue 4 intermediately of the length of the same and provided with an upwardly extending centrally positioned lug 26, said bracket being preferably semicircular in shape. 27 are ring members positioned on each side of the bracket 25 and pivotally connected at their bottoms centrally of the bracket 25. 28 is a rearwardly extending rod pivotally connected at its forward end to the upper portion of the ring member 27 and at its rear end to the lower end of the lever 29, said lever 29 being fulcrumed to the tongue 4 of the vehicle and its upper end extending within reach of the driver. 30 is a link straddling the bracket 25 and the spade-shaped ring members 27, said link being inserted through the ring 24 in the rod 22.

31 are springs, their rear ends connected to a cross-bar 32 secured to the forwardly extending arms 14 and their forward ends pivotally connected to the inner ends of the levers 15.

My brake operates as follows:

Assuming that the gear is in the position illustrated in the drawing, upon the vehicle going down grade, the horses naturally hold back, thus swinging the neck-yoke in such a position that the lug 23 is swung forwardly with the result that the rod 22, chain 21 and rod 20 will be all pulled forwardly, freedom of movement of the rod 22 being permitted by means of the elongated ring 24. As the rod 20 is connected at its rear end by means of the eye 19 with the links 18, which are in turn pivotally connected to the levers 15, in turn connected by the links 16 to the brake beam 9, such brake beam will be pulled rearwardly and the shoes 11 thrown into engagement with the wheels 12, thus braking the vehicle.

When the horses are put in the collar again the neck-yoke is swung in the reverse direction and through the medium of the springs 31, the brake beam is pushed forwardly, throwing the shoes out of engagement with the wheels. Although I have described the brake as functioning on a down grade it will be understood that it will also function whenever the horses are pulled up.

In backing up, the lever 29 is swung forwardly with the result that its lower end will be swung rearwardly and through the medium of the rod 28 will swing over the ring members 27 into the position illustrated in dotted lines in Figure 4 wherein they will force the link 30 over the lug 26 in a rearward direction and when the horses are pulled up, the strain will be taken by such link 30, thus preventing the rod 22 moving forwardly to pull forward the control rod 20 into the functioning position.

When the horses are in the collar the ring 30 also takes the strain and prevents the rods 22 moving rearwardly beyond the required extent. The springs 31 provide a quick release for the brakes and keep the brake blocks from scraping the wheels. Further they keep the brake beam in proper alignment while the wagon is being turned and also keep it in proper position when the link 30 is swung over the lug 26.

What I claim as my invention is:

1. In an automatic wagon brake, the combination with the brake actuating rod, of a bracket having an upwardly extending stud thereon, of a link pivotally connected to the rod and straddling the bracket, said link normally held in place on the forward side of the stud and manually operable means for throwing the link to the rear side of the stud.

2. In an automatic wagon brake, the combination with the brake actuating rod, of a bracket having an upwardly extending stud thereon, of a link pivotally connected to the rod and straddling the bracket, said link normally held in place on the forward side of the stud, ring members pivoted to the bracket and inserted through the link, and a fulcrumed actuating lever pivotally connected to the ring members.

WILLIAM HENRY PERRY.